(12) United States Patent
Li

(10) Patent No.: US 12,438,968 B2
(45) Date of Patent: Oct. 7, 2025

(54) DISPLAY MODULE

(71) Applicant: WUHAN CHINA STAR OPTOELECTRONICS SEMICONDUCTOR DISPLAY TECHNOLOGY CO., LTD., Wuhan (CN)

(72) Inventor: Wu Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 679 days.

(21) Appl. No.: 16/966,045

(22) PCT Filed: Mar. 16, 2020

(86) PCT No.: PCT/CN2020/079467
§ 371 (c)(1),
(2) Date: Apr. 4, 2023

(87) PCT Pub. No.: WO2021/098092
PCT Pub. Date: May 27, 2021

(65) Prior Publication Data
US 2023/0239382 A1    Jul. 27, 2023

(30) Foreign Application Priority Data
Nov. 21, 2019    (CN) .......................... 201911150979.X

(51) Int. Cl.
*G06F 1/16* (2006.01)
*H04M 1/02* (2006.01)
(Continued)

(52) U.S. Cl.
CPC ....... *H04M 1/0264* (2013.01); *H04M 1/0266* (2013.01)

(58) Field of Classification Search
CPC . H04M 1/0264; H04M 1/0266; G06F 1/1607; G06F 1/1605; G06F 1/1686
See application file for complete search history.

(56) References Cited

U.S. PATENT DOCUMENTS 10,976,615 B2 *   4/2021   Cheng ................... G02F 1/1339
12,204,192 B2 *   1/2025   Horie ...................... G06F 3/044
(Continued)

FOREIGN PATENT DOCUMENTS

CN    106101317 A    11/2016
CN    106250800 A    12/2016
(Continued)

*Primary Examiner* — Anthony M Haughton
(74) *Attorney, Agent, or Firm* — PV IP PC; Wei Te Chung

(57) ABSTRACT

A display module, including a display panel, a protective cover, and a camera module, is provided. The display panel includes a through-hole region provided with a through-hole, and a non-through-hole region. The protective cover is disposed on a light-emitting side of the display panel, and the camera module is disposed on a side facing away from the light-emitting side of the display panel. A lens of the camera module is disposed corresponding to the through-hole, a side of the protective cover close the display panel has an arc-shaped concave surface, and the arc-shaped concave surface is disposed corresponding to the through-hole.

20 Claims, 2 Drawing Sheets

(51) Int. Cl.
*H05K 5/00* (2025.01)
*H05K 7/00* (2006.01)

(56) References Cited

U.S. PATENT DOCUMENTS

| | | | |
|---|---|---|---|
| 2018/0126704 | A1 | 5/2018 | Zhang et al. |
| 2018/0234594 | A1* | 8/2018 | Lim ................. H04N 23/50 |
| 2019/0158641 | A1 | 5/2019 | Kim et al. |
| 2019/0331960 | A1 | 10/2019 | Li et al. |

FOREIGN PATENT DOCUMENTS

| | | | |
|---|---|---|---|
| CN | 106506742 A | 3/2017 | |
| CN | 107132884 A | 9/2017 | |
| CN | 107241466 A | 10/2017 | |
| CN | 206962883 U | 2/2018 | |
| CN | 108594524 A | 9/2018 | |
| CN | 109151098 A | 1/2019 | |
| CN | 208401907 U | 1/2019 | |
| CN | 208433994 U | 1/2019 | |
| CN | 110191208 A | 8/2019 | |
| CN | 110474997 A | 11/2019 | |
| CN | 209590474 U | 11/2019 | |
| JP | 2009294515 A | 12/2009 | |

* cited by examiner

DISPLAY MODULE

The present application claims priority of a Chinese patent application filed with the National Intellectual Property Administration on Nov. 21, 2019, application No. 201911150979.X, titled "Display module", which is incorporated by reference in the present application in its entirety.

FIELD OF INVENTION

The invention relates to the field of display technology, and in particular, to a display module.

BACKGROUND OF INVENTION

With advancement of technology, people have higher demands for electronic display products. Fullscreen with higher screen ratios have become a much-anticipated development direction of smartphones. How to build a front camera under a display screen is a critical issue to achieving full-screen technology. The front camera requires a transparent region in the display screen for light to pass through. However, the display screen cannot display images in the region, so screen ratio of the screen is reduced.

Technical Problem

The invention provides a display module to solve the technical problem. In the current display module, because the front camera is disposed under the screen, the display panel needs to reserve a transparent area for light to pass through. Thus, the display panel cannot display images in the area, which will reduce screen ratio of the display module.

SUMMARY OF INVENTION

To solve the above problems, the technical solution provided by the present invention is as follows:

The present invention provides a display module including a display panel, a protective cover and a camera module provided on two opposite sides of the display panel. The display panel includes a through-hole region and a non-through-hole region, and the through-hole region is provided with a through-hole. The protective cover is disposed on a light-emitting side of the display panel. The camera module is disposed on a side facing away from the light-emitting side of the display panel, the camera module includes a lens, and the lens is disposed corresponding to the through-hole, wherein a side of the protective cover close to the display panel has an arc-shaped concave surface, and the arc-shaped concave surface is disposed corresponding to the through-hole. The protective cover covers the display panel, and the size of a cross-section of the through-hole is smaller than or equal to the size of the lens.

In one embodiment of the present invention, a surface of the side of the protective cover close to the display panel includes a first sub-surface and a second sub-surface, the first sub-surface corresponds to the through-hole region, and the second sub-surface corresponds to the non-through-hole region.

In one embodiment of the present invention, the first sub-surface is a circular arc-shaped concave surface or an elliptical arc-shaped concave surface.

In one embodiment of the present invention, an orthographic projection of the first sub-surface on the display panel covers the through-hole of the display panel.

In one embodiment of the present invention, the first sub-surface is higher than the second sub-surface.

In one embodiment of the present invention, the first sub-surface is lower than the second sub-surface.

In one embodiment of the present invention, the second sub-surface is a plane and covers the non-through-hole region of the display panel.

In one embodiment of the present invention, the through-hole penetrates the display panel.

In one embodiment of the present invention, the protective cover is a glass substrate.

The present invention further provides a display module including a display panel, a protective cover and a camera module provided on two opposite sides of the display panel. The display panel includes a through-hole region and a non-through-hole region, and the through-hole region is provided with a through-hole. The protective cover is disposed on a light-emitting side of the display panel. The camera module is disposed on a side facing away from the light-emitting side of the display panel, the camera module includes a lens, and the lens is disposed corresponding to the through-hole, wherein a side of the protective cover close to the display panel has an arc-shaped concave surface, and the arc-shaped concave surface is disposed corresponding to the through-hole.

In one embodiment of the present invention, the protective cover covers the display panel.

In one embodiment of the present invention, a surface of the side of the protective cover close to the display panel includes a first sub-surface and a second sub-surface, the first sub-surface corresponds to the through-hole region, and the second sub-surface corresponds to the non-through-hole region.

In one embodiment of the present invention, the first sub-surface is a circular arc-shaped concave surface or an elliptical arc-shaped concave surface.

In one embodiment of the present invention, an orthographic projection of the first sub-surface on the display panel covers the through-hole of the display panel.

In one embodiment of the present invention, the first sub-surface is higher than the second sub-surface.

In one embodiment of the present invention, the first sub-surface is lower than the second sub-surface.

In one embodiment of the present invention, the second sub-surface is a plane and covers the non-through-hole region of the display panel.

In one embodiment of the present invention, a size of a cross-section of the through-hole is smaller than or equal to a size of the lens.

In one embodiment of the present invention, the through-hole penetrates the display panel.

In one embodiment of the present invention, the protective cover is a glass substrate.

Beneficial Effect

The beneficial effect of the present invention is as follows: a surface of the protective cover corresponding to the camera is designed from a planar structure to a curved structure. This way, when a camera with the same specification is placed, an area of the non-display region of the display panel corresponding to the camera can be reduced, thereby increasing the screen ratio of the display module.

DESCRIPTION OF DRAWINGS

In order to explain the technical solution in the embodiment or in the prior art more clearly, the drawings used in the description of the embodiment or in the prior art will be briefly introduced below. Obviously, the drawings in the following description are just some embodiments of the invention. For those of ordinary skill in the art, other drawings can be obtained based on these drawings without creative efforts.

DETAILED DESCRIPTION OF PREFERRED EMBODIMENTS

Figure 1:
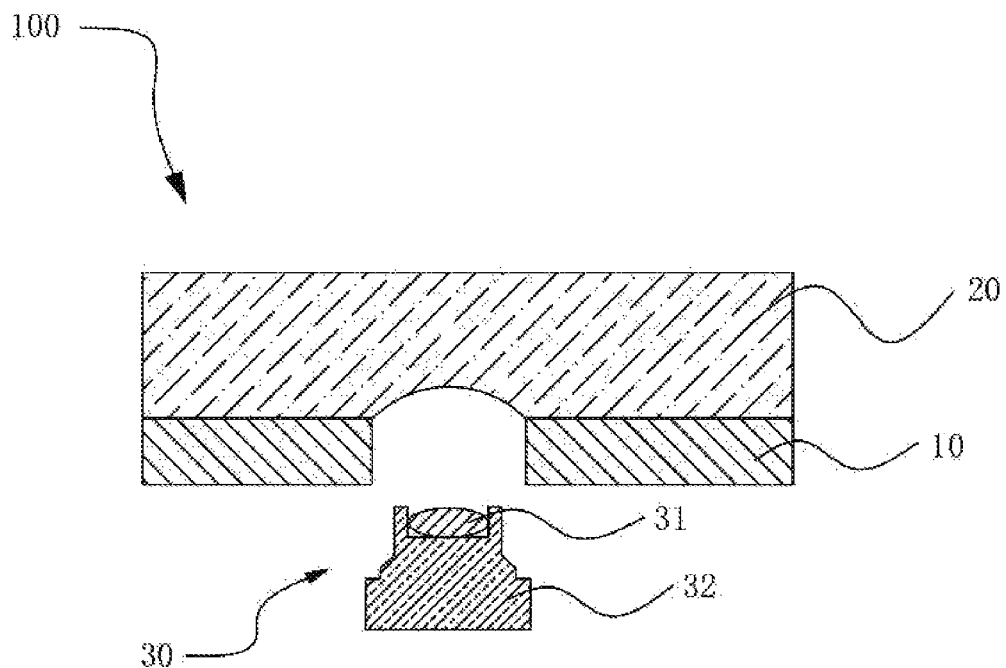
FIG. 1 is a schematic structural diagram of a display module according to an embodiment of the present invention.

The following description of the embodiments is provided to illustrate the specific embodiments of the invention. Directional terminology mentioned in the application, such as "above", "under", "front", "back", "left", "right", "inside", "outside", "side", etc., are only refer to the directions of the accompanying drawings. Therefore, the directional terms are used for explaining and understanding the present invention, but not for limiting the present invention. In the drawings, similarly structured units are denoted by the same reference numerals.

The present invention is directed to a technical problem of current display module. Because the front camera is built under the screen, the display panel needs to reserve a transparent region for light to pass through, and the display panel cannot display images in the region, which will cause the technical problem that the screen ratio of the display module is reduced. The present embodiment can solve the problem.

As shown in FIG. 1, an embodiment of the present invention provides a display module 100 including a display panel 10, a protective cover 20, and a camera module 30 disposed on two opposite sides of the display panel 10, wherein the protective cover 20 is disposed on a light-emitting side of the display panel 10, and the camera module 30 is disposed on a side of the display panel 10 facing away from the light-emitting side.

Specifically, the camera module 30 includes a lens 31, a motherboard 32 carrying the lens 31, an image sensor, and a signal processor.

Figure 2:
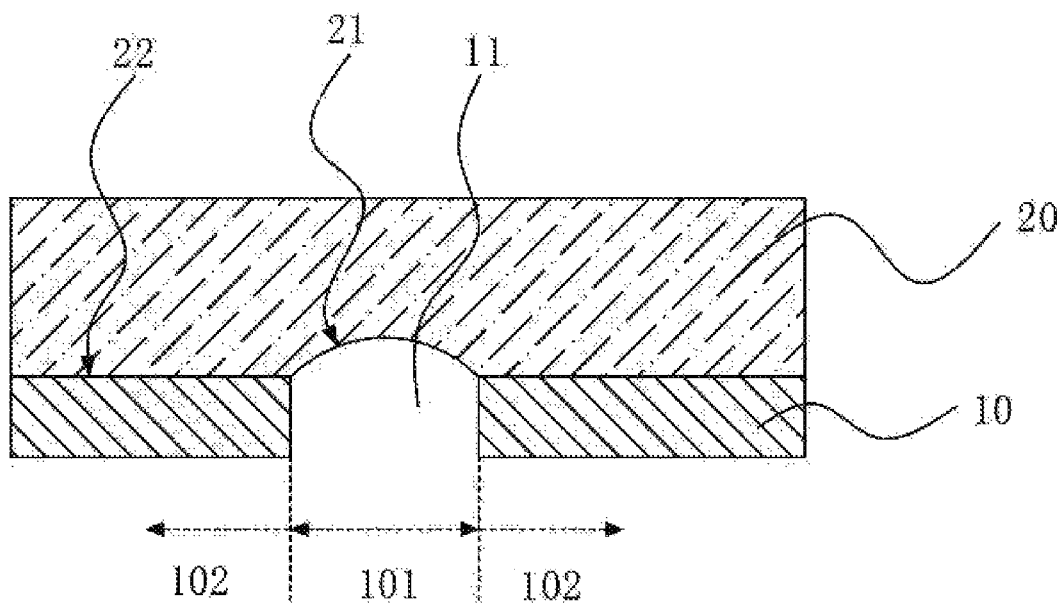
FIG. 2 is a schematic structural diagram of a protective cover according to an embodiment of the present invention.

As shown in FIG. 2, the protective cover 20 covers the display panel 10 for protection, and the display panel 10 includes a through-hole region 101 and a non-through-hole region 102. The non-through-hole region 102 can be disposed around the through-hole region 101, and the through-hole region 101 is a transparent region. The through-hole region 101 is provided with a through-hole 11, and the through-hole 11 is disposed corresponding to the lens 31. The through-hole 11 is disposed directly above the lens 31 to provide a light path so that light can be irradiated onto the lens 31.

Since the through-hole region 101 is used to create a through-hole 11, the through-hole region 101 cannot be used to display images. Thus, the screen ratio of the display panel is affected. An embodiment of the present invention improves the structure of the protective cover 20 above the display panel 10, a side of the protective cover 20 close to the display panel 10 has an arc-shaped concave surface, and the arc-shaped concave surface is disposed correspondingly to the through-hole 11. The arc-shaped concave surface forms a groove with respect to the protective cover 20. That is, the arc-shaped concave surface is an arched structure with respect to the lens 31 below. Compared with the planar structure of the prior art, the curved concave surface has a larger surface area under the same width dimension, which can provide a larger incident surface for light to pass through, so that the light can be completely distributed on the lens 31.

Specifically, as shown in FIG. 2, a surface (lower surface) of the side of the protective cover 20 close to the display panel 10 includes a first sub-surface 21 and a second sub-surface 22. The first sub-surface 21 is disposed corresponding to the through-hole region 101 and the second sub-surface 22 is disposed corresponding to the non-through-hole region 102.

The first sub-surface 21 is disposed corresponding to the through-hole 11 and is disposed directly above the through-hole 11. The first sub-surface 21 is a circular arc-shaped concave surface or an elliptical arc-shaped concave surface. Preferably, an orthographic projection of the first sub-surface 21 on the display panel 20 covers the through-hole 11 of the display panel 10. This way, the light can reach the lens 31 to the maximum extent.

The second sub-surface 22 is a planar surface and covers the non-through-hole region 102 of the display panel 10, and the second sub-surface 22 is lower than the first sub-surface 21. That is, relative to the lens 31, the first sub-surface 21 is far away from the lens 31. The first sub-surface 21 is an arched structure so that when external light passes through the first sub-surface 21, the light can be more divergent.

A size of a cross-section of the through-hole 11 is smaller than or equal to a size of the lens 31. Compared with the prior art, when the lens size is the same, the embodiment of the present invention can achieve a smaller size of the through-hole 11 and occupy less area of the non-display region, thereby increasing the screen ratio. However, in the prior art, a through-hole having a size larger than that of the lens needs to be provided to ensure sufficient light irradiation.

The through-hole 11 penetrates the display panel 10. In other embodiments, the through-hole 11 may not penetrate the display panel 10, and a through-hole is only provided on a part of the film layer of the display panel 10, but it must be ensured that the film layer without the through-hole will not affect light transmission.

The display panel 10 may be one of a liquid crystal display panel, an organic light-emitting diode (OLED) display panel, or a touch display panel, which is not limited herein.

The protective cover 20 is a glass substrate, and the protective cover 20 can be manufactured by performing a photolithography process on the glass substrate, such as exposure, development, and etching. First, a patterned photoresist is retained on the glass substrate corresponding to the second sub-surface 22, and then the glass substrate is etched at a position corresponding to the first sub-surface 21 to form an arc-shaped concave structure on the glass substrate, thereby forming the protective cover 20.

Figure 3:
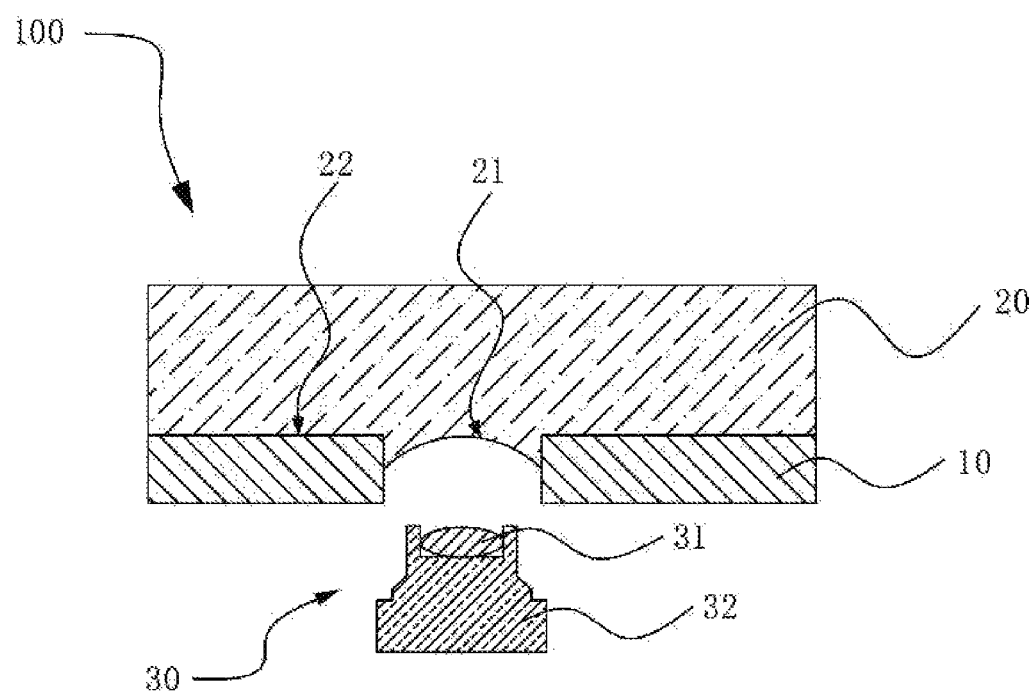
FIG. 3 is a schematic structural diagram of a display module according to another embodiment.

As shown in FIG. 3, in other embodiments, the second sub-surface 22 is higher than the first sub-surface 21. That is, the first sub-surface 21 is close to the lens 31, and the first sub-surface 21 is a circular arc-shaped concave surface or an elliptical arc-shaped concave surface, and the second sub-surface 22 is a planar surface.

Wherein the second sub-surface 22 covers the surface of the display panel 10, and the first sub-surface 21 is embedded in the through-hole 11. That is, an area of the protective cover 20 corresponding to the through-hole region 101 is partially embedded in the through-hole 11.

In the process of manufacturing the protective cover 20, a yellow light process is required to be performed on the glass substrate using a multi-transmittance mask to form a patterned protective cover 20. First, photoresists of different thicknesses are formed on a glass substrate, and then the glass substrate is etched to different degrees. Planar structure (second sub-surface 22) or curved concave surface (first sub-surface 21) structure are formed in different regions of the glass substrate, respectively, and the protective cover 20 is further formed.

The better values of the arc angle and the arc length of the first sub-surface 21 can be determined based on the vertical distance from the lens 31 to the protective cover 20, the diameter of the lens 31, and the refractive index of the protective cover 20 and air. The arc angle and arc length of the curved concave surface can be calculated according to the optical principle.

The beneficial effects of the present invention are: a surface of the protective cover corresponding to the camera is designed from a planar structure to a curved structure. This way, when a camera with the same specification is placed, an area of the non-display region of the display panel corresponding to the camera can be reduced, thereby increasing the screen ratio of the display module.

As described above, although the present invention has been disclosed with the preferred embodiments, the preferred embodiments are not intended to limit the present invention. Those of ordinary skill in the art can make various modifications and decorations without departing from the spirit and scope of the present invention. Therefore, the protection scope of the present invention is subject to the scope defined by the claims.

What is claimed is:

1. A display module, comprising:
   a display panel comprising a through-hole region and a non-through-hole region, and the through-hole region provided with a through-hole;
   a protective cover disposed on a light-emitting side of the display panel; and
   a camera module disposed on a side facing away from the light-emitting side of the display panel, the camera module comprising a lens, and the lens disposed corresponding to the through-hole;
   wherein the protective cover has an arc-shaped concave surface at a side close to the display panel, and the arc-shaped concave surface is disposed corresponding to the through-hole, the protective cover covers the display panel, and a size of a cross-section of the through-hole is smaller than or equal to a size of the lens;
   wherein the arc-shaped concave surface has an arc-shape in a plane perpendicular to the protective cover.

2. The display module according to claim 1, wherein a surface of the side of the protective cover close to the display panel comprises a first sub-surface and a second sub-surface, the first sub-surface corresponds to the through-hole region, and the second sub-surface corresponds to the non-through-hole region.

3. The display module according to claim 2, wherein the first sub-surface is a circular arc-shaped concave surface or an elliptical arc-shaped concave surface.

4. The display module according to claim 3, wherein an orthographic projection of the first sub-surface on the display panel covers the through-hole of the display panel.

5. The display module according to claim 3, wherein the first sub-surface is higher than the second sub-surface.

6. The display module according to claim 3, wherein the first sub-surface is lower than the second sub-surface.

7. The display module according to claim 2, wherein the second sub-surface is a plane and covers the non-through-hole region of the display panel.

8. The display module according to claim 1, wherein the through-hole penetrates the display panel.

9. The display module according to claim 1, wherein the protective cover is a glass substrate.

10. A display module, comprising:
    a display panel comprising a through-hole region and a non-through-hole region, and the through-hole region provided with a through-hole;
    a protective cover disposed on a light-emitting side of the display panel; and
    a camera module disposed on a side facing away from the light-emitting side of the display panel, the camera module comprising a lens, and the lens disposed corresponding to the through-hole;
    wherein the protective cover has an arc-shaped concave surface at a side close to the display panel, and the arc-shaped concave surface is disposed corresponding to the through-hole;
    wherein the arc-shaped concave surface has an arc-shape in a plane perpendicular to the protective cover.

11. The display module according to claim 10, wherein the protective cover covers the display panel.

12. The display module according to claim 10, wherein a surface of the side of the protective cover close to the display panel comprises a first sub-surface and a second sub-surface, the first sub-surface corresponds to the through-hole region, and the second sub-surface corresponds to the non-through-hole region.

13. The display module according to claim 12, wherein the first sub-surface is a circular arc-shaped concave surface or an elliptical arc-shaped concave surface.

14. The display module according to claim 13, wherein an orthographic projection of the first sub-surface on the display panel covers the through-hole of the display panel.

15. The display module according to claim 13, wherein the first sub-surface is higher than the second sub-surface.

16. The display module according to claim 13, wherein the first sub-surface is lower than the second sub-surface.

17. The display module according to claim 12, wherein the second sub-surface is a plane and covers the non-through-hole region of the display panel.

18. The display module according to claim 10, wherein a size of a cross-section of the through-hole is smaller than or equal to a size of the lens.

19. The display module according to claim 10, wherein the through-hole penetrates the display panel.

20. The display module according to claim 10, wherein the protective cover is a glass substrate.

* * * * *